US006901525B2

(12) United States Patent
Baker et al.

(10) Patent No.: US 6,901,525 B2
(45) Date of Patent: May 31, 2005

(54) METHOD AND APPARATUS FOR MANAGING POWER CONSUMPTION ON A BUS

(75) Inventors: William P. Baker, Salt Lake City, UT (US); Todd R. Shelton, Syracuse, UT (US); Theodore J. Smith, Layton, UT (US)

(73) Assignee: Iomega Corporation, San Diego, CA (US)

( * ) Notice: Subject to any disclaimer, the term of this patent is extended or adjusted under 35 U.S.C. 154(b) by 770 days.

(21) Appl. No.: 09/866,568

(22) Filed: May 25, 2001

(65) Prior Publication Data

US 2003/0037269 A1 Feb. 20, 2003

(51) Int. Cl.[7] .................................................. G06F 1/26
(52) U.S. Cl. ...................................... 713/340; 713/300
(58) Field of Search ............................ 713/1, 300, 310, 713/320, 340

(56) References Cited

U.S. PATENT DOCUMENTS

| | | |
|---|---|---|
| 2,278,280 A | 3/1942 | Pfeiffer et al. |
| 2,896,833 A | 7/1959 | Markham |
| 3,144,236 A | 8/1964 | Clanin |
| 3,692,264 A | 9/1972 | Burkhard et al. |
| 3,695,421 A | 10/1972 | Wood |
| 4,061,228 A | 12/1977 | Johnson |
| 4,062,049 A | 12/1977 | Dirks |
| 4,359,762 A | 11/1982 | Stollorz |
| 4,414,576 A | 11/1983 | Randmae |
| 4,507,689 A | 3/1985 | Kozuki et al. |
| 4,527,262 A | 7/1985 | Manto |
| 4,550,343 A | 10/1985 | Nakatani |
| 4,562,500 A | 12/1985 | Bygdnes |
| 4,622,607 A | 11/1986 | Smith, II |
| 4,639,863 A | 1/1987 | Harrison |
| 4,683,520 A | 7/1987 | Grassens et al. |
| 4,688,206 A | 8/1987 | Nakagawa et al. |
| 4,705,257 A | 11/1987 | Leo et al. |
| 4,709,817 A | 12/1987 | Keady |
| 4,712,146 A | 12/1987 | Moon |

(Continued)

FOREIGN PATENT DOCUMENTS

| | | |
|---|---|---|
| DE | 41 10 399 A1 | 10/1992 |
| DE | 43 04 506 | 8/1994 |
| EP | 0 204 299 | 12/1986 |
| EP | 0 210 497 | 2/1987 |
| EP | 0 335 490 | 10/1989 |
| EP | 0 426 414 | 5/1991 |
| EP | 1049325 A2 | 11/2000 |
| FR | 2 691 435 | 11/1993 |
| GB | 2 228 819 | 9/1990 |
| GB | 2 243 940 | 11/1991 |

(Continued)

OTHER PUBLICATIONS

"IBM Travelstar E—External Hard Disk Drive—Installation and Operation Guide", IBM Storage Systems Division, San Jose, California, 2000, 10 sheets.

(Continued)

*Primary Examiner*—Dennis M. Butler
(74) *Attorney, Agent, or Firm*—James T. Hagler

(57) ABSTRACT

An information storage device (10) includes a cartridge (14) removably inserted into a cradle (13) that has a drive module (18) releasably coupled to an interface module (17). The interface module can be operatively coupled by a cable (12) to a remote system. Communications through the cable conform to an industry-standard protocol. The storage device can receive power from either the cable or an external power source (31). The interface module can detect a change in the source of its operating power during normal system operation, and ensure that this is reported through the cable.

8 Claims, 2 Drawing Sheets

U.S. PATENT DOCUMENTS

| | | | |
|---|---|---|---|
| 4,724,500 | A | 2/1988 | Dalziel |
| 4,749,164 | A | 6/1988 | Leo et al. |
| 4,754,397 | A | 6/1988 | Varaiya et al. |
| 4,763,225 | A | 8/1988 | Frenkel et al. |
| 4,769,764 | A | 9/1988 | Levanon |
| 4,791,511 | A | 12/1988 | Davis |
| 4,806,106 | A | 2/1989 | Mebane |
| 4,833,554 | A | 5/1989 | Dalziel et al. |
| 4,853,807 | A | 8/1989 | Trager |
| 4,856,656 | A | 8/1989 | Sugimoto et al. |
| 4,869,369 | A | 9/1989 | Turngren |
| 4,884,261 | A | 11/1989 | Dalziel |
| 4,893,210 | A | 1/1990 | Mintzlaff |
| 4,893,263 | A | 1/1990 | Myers |
| 4,896,777 | A | 1/1990 | Lewis |
| 4,908,715 | A | 3/1990 | Krum |
| 4,926,291 | A | 5/1990 | Sarraf |
| 4,937,806 | A | 6/1990 | Babson et al. |
| 4,965,691 | A | 10/1990 | Iftikar et al. |
| 4,974,103 | A | 11/1990 | Iftikar et al. |
| 5,002,368 | A | 3/1991 | Anglin |
| 5,004,207 | A | 4/1991 | Ishikawa et al. |
| 5,024,328 | A | 6/1991 | Bontrager |
| 5,025,335 | A | 6/1991 | Stefansky |
| 5,041,924 | A | 8/1991 | Blackborow et al. |
| 5,065,262 | A | 11/1991 | Blackborow |
| 5,084,791 | A | 1/1992 | Thanos |
| 5,126,890 | A | 6/1992 | Wade et al. |
| 5,128,830 | A | 7/1992 | Deluca et al. |
| 5,160,473 | A | 11/1992 | Bontrager |
| 5,170,300 | A | 12/1992 | Stefansky |
| 5,175,657 | A | 12/1992 | Iftikar et al. |
| 5,204,794 | A | 4/1993 | Yoshida |
| 5,207,327 | A | 5/1993 | Brondos |
| 5,208,712 | A | 5/1993 | Hatch et al. |
| 5,214,550 | A | 5/1993 | Chan |
| 5,223,996 | A | 6/1993 | Read et al. |
| 5,235,481 | A | 8/1993 | Kamo et al. |
| 5,241,436 | A | 8/1993 | Kawabata |
| 5,243,485 | A | 9/1993 | Weiley |
| H1245 | H | 10/1993 | Griswold et al. |
| 5,253,129 | A | 10/1993 | Blackborow et al. |
| 5,258,888 | A | 11/1993 | Korinsky |
| 5,303,101 | A | 4/1994 | Hatch et al. |
| 5,317,464 | A | 5/1994 | Witt et al. |
| 5,359,504 | A | 10/1994 | Ohmi et al. |
| 5,363,227 | A | 11/1994 | Ichikawa et al. |
| 5,363,276 | A | 11/1994 | Crockett |
| 5,372,515 | A | 12/1994 | Miller et al. |
| 5,392,197 | A | 2/1995 | Cuntz et al. |
| 5,400,196 | A | 3/1995 | Moser et al. |
| 5,400,389 | A | 3/1995 | Niiyama et al. |
| 5,402,308 | A | 3/1995 | Koyanagi et al. |
| 5,408,383 | A | 4/1995 | Nagasaka et al. |
| 5,412,522 | A | 5/1995 | Lockhart et al. |
| 5,426,562 | A | 6/1995 | Morehouse et al. |
| 5,436,857 | A | 7/1995 | Nelson et al. |
| 5,438,162 | A | 8/1995 | Thompson et al. |
| 5,444,586 | A | 8/1995 | Iftikar et al. |
| 5,448,433 | A | 9/1995 | Morehouse |
| 5,452,159 | A | 9/1995 | Stefansky |
| 5,454,080 | A | 9/1995 | Fasig et al. |
| 5,463,527 | A | 10/1995 | Hager et al. |
| 5,477,401 | A | 12/1995 | Squires et al. |
| 5,479,285 | A | 12/1995 | Burke |
| 5,502,604 | A | 3/1996 | Furay |
| 5,532,889 | A | 7/1996 | Stefansky et al. |
| 5,532,891 | A | 7/1996 | Tsujino |
| 5,550,712 | A | 8/1996 | Crockett |
| 5,585,986 | A | 12/1996 | Parkin |
| 5,615,070 | A | 3/1997 | Bordes |
| 5,631,788 | A | 5/1997 | Richards |
| 5,644,454 | A | 7/1997 | Arya et al. |
| 5,663,855 | A | 9/1997 | Kim et al. |
| 5,715,169 | A | 2/1998 | Noguchi |
| 5,724,216 | A | 3/1998 | Iftikar et al. |
| 5,727,170 | A | 3/1998 | Mitchell et al. |
| 5,734,860 | A | 3/1998 | Kondo |
| 5,739,995 | A | 4/1998 | Ohmi et al. |
| 5,754,357 | A | 5/1998 | Anderson et al. |
| 5,793,207 | A | 8/1998 | Gill |
| 5,808,830 | A | 9/1998 | Stefansky |
| 5,808,866 | A | 9/1998 | Porter |
| 5,809,520 | A | 9/1998 | Edwards et al. |
| 5,812,373 | A | 9/1998 | Hwang |
| 5,818,029 | A | 10/1998 | Thomson |
| 5,831,788 | A | 11/1998 | Hofland |
| 5,837,934 | A | 11/1998 | Valavanis et al. |
| 5,841,605 | A | 11/1998 | Foster et al. |
| 5,842,027 | A * | 11/1998 | Oprescu et al. ............. 713/300 |
| 5,872,669 | A | 2/1999 | Morehouse et al. |
| 5,928,347 | A | 7/1999 | Jones |
| 5,940,629 | A | 8/1999 | Rikukawa et al. |
| 5,943,193 | A | 8/1999 | Thayne et al. |
| 5,943,208 | A | 8/1999 | Kato et al. |
| 5,949,630 | A | 9/1999 | Yamamoto et al. |
| 5,969,901 | A | 10/1999 | Eckberg et al. |
| 5,986,991 | A | 11/1999 | Kawahara et al. |
| 5,995,365 | A | 11/1999 | Broder et al. |
| 5,999,406 | A | 12/1999 | McKain et al. |
| 6,021,029 | A | 2/2000 | Mamiya et al. |
| 6,025,973 | A | 2/2000 | Mizoshita et al. |
| 6,028,744 | A | 2/2000 | Amirkiai et al. |
| 6,082,543 | A | 7/2000 | Béliveau |
| 6,088,312 | A | 7/2000 | Utsumi |
| 6,119,183 | A | 9/2000 | Briel et al. |
| 6,128,670 | A | 10/2000 | Hashimoto et al. |
| 6,131,141 | A | 10/2000 | Ravid |
| 6,144,552 | A | 11/2000 | Whitcher et al. |
| 6,154,330 | A | 11/2000 | Nakagawa |
| 6,154,360 | A | 11/2000 | Kaczeus, Sr. et al. |
| 6,166,901 | A | 12/2000 | Gamble et al. |
| 6,178,514 | B1 * | 1/2001 | Wood ........................ 713/300 |
| 6,185,069 | B1 | 2/2001 | Schick |
| 6,201,771 | B1 | 3/2001 | Otsuka et al. |
| 6,230,074 | B1 | 5/2001 | Shinkai |
| 6,252,744 | B1 | 6/2001 | Kelemen |
| 6,259,573 | B1 | 7/2001 | Tsuwako et al. |
| 6,266,724 | B1 | 7/2001 | Harari et al. |
| 6,285,092 | B1 | 9/2001 | Kawahara et al. |
| 6,298,016 | B1 | 10/2001 | Otsuka |
| 6,301,087 | B1 | 10/2001 | Combe |
| 6,304,440 | B1 | 10/2001 | Lin |
| 6,320,744 | B1 | 11/2001 | Sullivan et al. |
| 6,324,054 | B1 | 11/2001 | Chee et al. |
| 6,353,870 | B1 | 3/2002 | Mills et al. |
| 6,374,315 | B1 | 4/2002 | Okada et al. |
| 6,378,028 | B2 | 4/2002 | Inagawa et al. |
| 6,386,979 | B1 | 5/2002 | Ho et al. |
| 6,388,591 | B1 | 5/2002 | Ng |
| 6,496,979 | B1 | 12/2002 | Chen et al. |
| 6,501,612 | B1 | 12/2002 | Kato et al. |
| 6,510,485 | B1 | 1/2003 | Shin |
| 6,519,669 | B1 | 2/2003 | Yanagisawa |
| 6,564,290 | B1 | 5/2003 | Lechner |
| 6,566,838 | B2 | 5/2003 | Maiocchi |
| 6,570,728 | B2 | 5/2003 | Iizuka et al. |
| 6,574,058 | B1 | 6/2003 | Aruga et al. |
| 6,587,300 | B1 | 7/2003 | Dobbek |
| 6,601,129 | B1 | 7/2003 | Arakeri et al. |
| 2002/0042152 | A1 | 4/2002 | Yamazaki et al. |

| | | |
|---|---|---|
| 2002/0044416 A1 | 4/2002 | Harmon, III et al. |
| 2003/0135681 A1 * | 7/2003 | Laity et al. ............... 710/303 |

FOREIGN PATENT DOCUMENTS

| | | |
|---|---|---|
| JP | 62-259284 | 11/1987 |
| JP | 1-189091 | 7/1989 |
| JP | 06-236669 | 8/1994 |
| JP | 2000099217 | 4/2000 |
| WO | WO 93/24932 | 12/1993 |
| WO | WO 99/06902 | 2/1999 |

OTHER PUBLICATIONS

Thomas A. Wilke, U.S. Appl. No. 09/590,508 filed Jun. 9, 2000.

Thomas A. Wilke, U.S. Appl. No. 09/591,081 filed Jun. 9, 2000.

Thomas A. Wilke, Allen T. Bracken, U.S. Appl. No. 09/591,354 filed Jun. 9, 2000.

Thomas A. Wilke, Allen T. Bracken, Brent J. Watson, Fred C. Thomas III, U.S. Appl. No. 09/591,074 filed Jun. 9, 2000.

Thomas A. Wilke, Marvin R. DeForest, Dennis D. Ogden, U.S. Appl. No. 09/591,540 filed Jun. 9, 2000.

Allen T. Bracken, Mark L. Reimann, Theodore J. Smith, U.S. Appl. No. 09/591,538 filed Jun. 9, 2000.

Jeffery D. Penman, Todd R. Shelton, U.S. Appl. No. 09/590,509 filed Jun. 9, 2000.

Randall C. Bauck, U.S. Appl. No. 09/590,498, filed Jun. 9, 2000.

Randall C. Bauck, Allen T. Bracken, Thomas A. Wilke, David S. Greenhalgh, U.S. Appl. No. 09/590,511 filed Jun. 9, 2000.

Daniel D. Rochat, Mark L. Reimann, Allen T. Bracken, U.S. Appl. No. 09/746,304 filed Dec. 21, 2000.

Allen T. Bracken, Theodore J. Smith, Jeffery D. Penman, Todd R. Shelton, David S. Greenhalgh; Paul E. Jacobs, Spencer W. Stout, Paul C. Kunz, Scott P. Thomas, Douglas S. Reynolds, David L. Jolley, Ryan D. Osterhout, U.S. Appl. No. 09/755,961 filed Jan. 4, 2001.

Paul C. Kunz, U.S. Appl. No. 09/854,354, filed May 11, 2001.

Paul C. Kunz, Ryan D. Osterhout, Theodore J. Smith, Spencer W. Stout, Scott P. Thomas, U.S. Appl. No. 09/854,391 filed May 11, 2001.

Fred C. Thomas III, U.S. Appl. No. 09/839,515, filed Apr. 20, 2001.

Ryan D. Osterhout, Scott P. Thomas, Paul C. Kunz, Allen T. Bracken, U.S. Appl. No. 09/858,073, filed May 14, 2001.

Todd R. Shelton, Theodore J. Smith, Marvin R. DeForest, Kelly D. Wright, Mark L. Reimann, Hiromichi (nmi) Oribe, Jeffery D. Penman, U.S. Appl. No. 09/855,993, filed May 14, 2001.

* cited by examiner

METHOD AND APPARATUS FOR MANAGING POWER CONSUMPTION ON A BUS

TECHNICAL FIELD OF THE INVENTION

This invention relates in general to devices which communicate through a bus, and more particularly, to techniques by which such devices report through the bus the extent to which they provide power to or draw power from the bus.

BACKGROUND OF THE INVENTION

Various industry-standard protocols have been developed to facilitate communication between computers and peripherals. In most of these arrangements, multiple devices are coupled to and communicate through some form of bus, which may be one central bus to which all items are coupled, multiple bus sections coupled in a daisy-chain configuration, or some other arrangement. Some of these standards permit a device to draw some or all of its operating power from the bus under certain conditions.

One example is the IEEE 1394 communication protocol, promulgated by the Institute of Electrical and Electronic Engineers. This standard categorizes devices according to the manner in which they handle operating power. In this regard, some devices generate all of their own operating power, plus some excess power which they supply to the bus. Other devices generate their own operating power, but do not supply any excess power to the bus. Still other devices draw some or all of their operating power from the bus.

With respect to this latter type of device, the IEEE 1394 standard permits each such device to draw up to 3 watts of operating power from the bus. If the device needs additional operating power, it must first submit a request for additional power across the bus while drawing no more than 3 watts, and must specify how much additional power it wants. A bus master which manages the bus will then determine if there are other devices on the bus that are generating sufficient excess power to meet the need of the requesting device. If so, then the requesting device will be granted authorization to draw that additional power from the bus. Otherwise, the requesting device will be denied authorization to draw additional power from the bus, and will typically not become fully operational.

When each device is powered up, or when a reset occurs on the bus, the device reports to the bus master which of several categories it falls in with respect to use of bus power, so that the bus master knows whether some devices are supplying excess power to the bus which other devices can be authorized to utilize, and knows the extent to which some devices are drawing the excess power from the bus. In this regard, each device typically knows it is permanently allocated to a single predetermined power utilization category, reflecting how it was designed to operate.

While existing approaches of this type have been generally adequate for their intended purposes, they have not been satisfactory in all respects. As one example, and as noted above, if a device requests additional power from the bus but it is not available, the device will typically not become fully operational. This can annoy the user, and create dissatisfaction with the manufacturer of the device.

SUMMARY OF THE INVENTION

From the foregoing, it may be appreciated that a need has arisen for a method and apparatus which facilitate operation of a device that is capable of drawing its operational power from a bus. According to the present invention, a method and apparatus are provided to address this need, and relate to operation of a device having a first coupling section which can detachably couple the device to a bus that includes a power line, having a second coupling section which can detachably couple the device to a source of power, and having circuitry coupled to each of the first and second coupling sections. The method and apparatus involve: operating the circuitry in a selected one of a plurality of modes, including a first mode in which the circuitry draws operating power from the power line through the first coupling section when no power is being received through the second coupling section, and a second mode in which the circuitry draws power through the second coupling section when a power source is supplying power to the second coupling section; automatically determining which of the first and second modes the circuitry is currently operating in; and automatically reporting through the first coupling section which of the first and second modes the circuitry is currently operating in.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
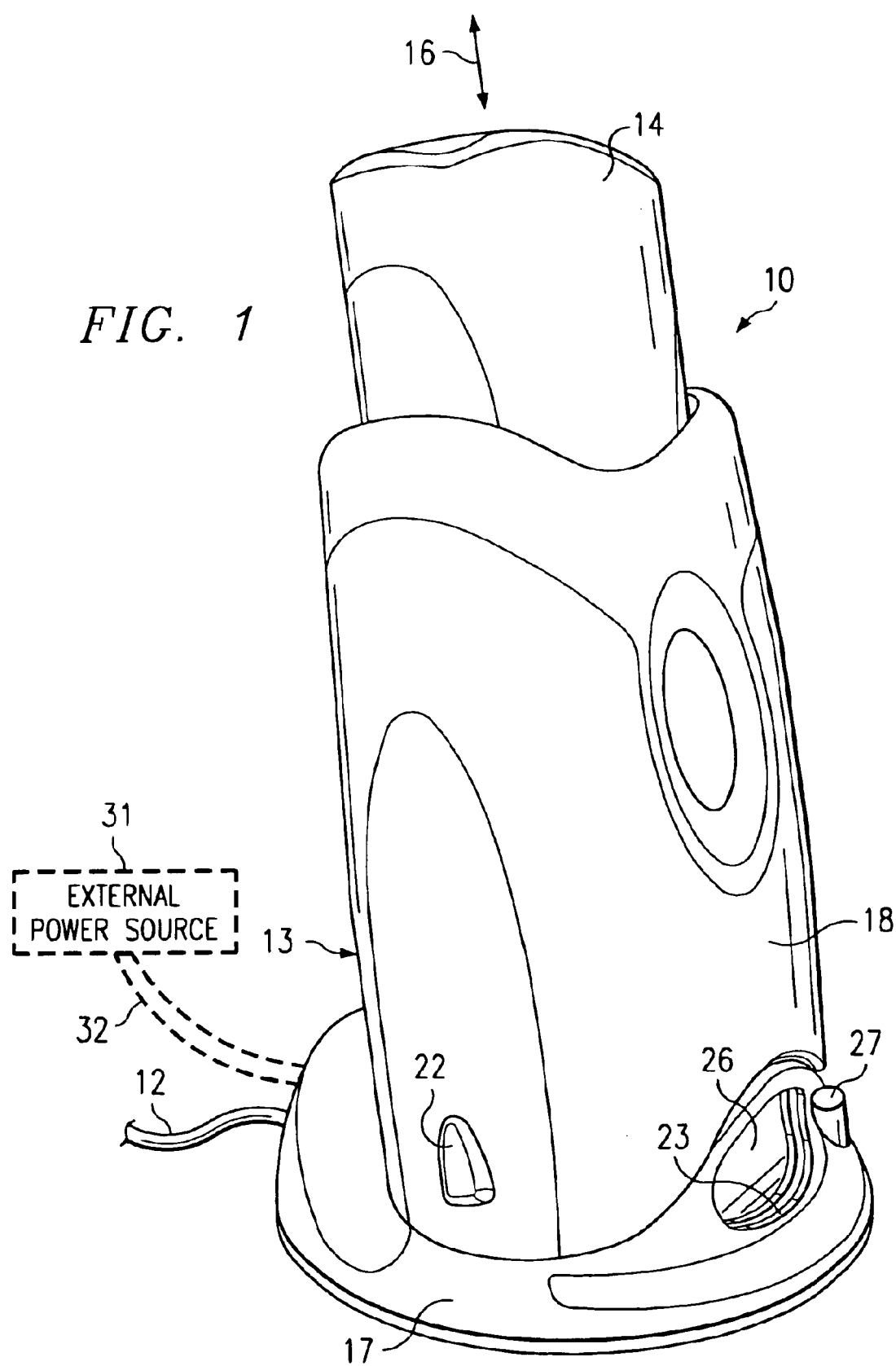
FIG. 1 is a diagrammatic perspective view of an information storage device which embodies aspects of the present invention.

FIG. 1 is a diagrammatic perspective view of an information storage device 10 which embodies aspects of the present invention, and which can be coupled by a cable 12 to a not-illustrated computer system of a known type. The information storage device 10 includes a receiving unit or cradle 13, and includes an information storage cartridge 14 which is removably inserted into the cradle 13. The cartridge 14 is inserted into and removed from the cradle 13 in directions which are approximately vertical, as indicated by a double-headed arrow 16 in FIG. 1. In the disclosed embodiment, communications through the cable 12 are carried out according to a industry-standard protocol commonly known as IEEE 1394, which was promulgated by the Institute of Electrical and Electronic Engineers, and which is often referred to by the alternative name of "FireWire".

The cradle 13 includes a base or interface module 17, and a drive module 18. The interface module 17 and drive module 18 are physically separate modules, and are releasably coupled to each other by a not-illustrated coupling mechanism. Details of the coupling mechanism are not needed in order to understand the present invention, and the coupling mechanism is therefore not illustrated and described here in detail. Two manually operable release buttons are provided on opposite sides of the drive module 18, and one of these two buttons is visible at 22 in FIG. 1. When the two release buttons 22 are simultaneously manually pressed, the detachable coupling between the drive module 18 and the interface module 17 is released, so that these modules can be separated.

The interface module 17 has a window 23 provided through a front wall portion thereof. A liquid crystal display (LCD) 26 is provided on the drive module 18, and is visible through the window 23 of the interface module 17 when these two modules are releasably coupled together. A manually operable eject button 27 is provided on the interface module 17. When the eject button 27 is manually pressed downwardly, the interface module 17 sends the drive module 18 an electrical signal, and this signal causes the drive module 18 to release a locking or latching mechanism that releasably holds the cartridge 14 in place, and to then effect a partial ejection of the cartridge 14. Details of this mechanism are not needed in order to understand the present invention, and this mechanism is therefore not illustrated and described in detail.

The device 10 is capable of operating in two different modes. In one mode, the device 10 draws its operating power from the IEEE 1394 bus which extends through the cable 12. In the second mode, an external power source 31 of a known type is coupled through a cable 32 to the device 10. When the external power source 31 is coupled to the device 10 through the cable 32, the device 10 draws all of its operating power from the external power source 31, and draws little or no operating power from the bus in cable 12.

With respect to the first mode of operation, in which the device 10 draws power from the bus, the industry-standard specification for the IEEE 1394 protocol specifies that any device coupled to the bus may unconditionally draw a limited amount of operating power from the bus in cable 12, which should not exceed 3 watts. If a device wants to draw more power from the bus, it must send a request to do so through the cable 12, using no more than the allowable 3 watts to make the request. The request must specify the amount of additional power that the device is seeking, indicating either that it wants up to 3 additional watts of power, or up to 7 additional watts of power. In the disclosed embodiment, the device 10 is designed to submit such a request, to seek permission to draw an additional 7 watts from the bus, or in other words a total 10 watts.

The decision of whether to grant authorization to a device to draw additional power is made on the basis of how many devices are currently coupled to the bus, and the extent to which unused power is or is not currently available on the bus. If sufficient unused power is currently available, then the requesting device will be sent a "LinkOn" command through the cable 12, according to the industry-standard protocol. In response to the LinkOn command, the device will begin drawing additional power from the bus. If excess power is not available, the LinkOn command will not be not transmitted to the device. The device will therefore not draw the extra power it wants from the bus, therefore will not enter a fully operational status, and thus will usually not attempt further interaction with the bus.

In order to facilitate evaluation of how much excess power is available on the bus at any given point in time, each device is required to report how it interacts with the bus with respect to the use of power. In this regard, according to the industry-standard specification, each device coupled to the IEEE 1394 bus is required to report the manner in which it uses bus power when it is first powered up, when the IEEE 1394 bus is subjected to a reset, and/or when it detects that it has been coupled to the bus.

Some devices generate all of the power that they need for their own operation, and also generate some excess power which they supply to the bus, for example in quantities of at least 15 watts, at least 30 watts, or at least 45 watts. Other devices generate the power that they need for their own operation, but do not supply any excess power to the bus.

Still other devices, as discussed above, draw some or all of their operating power from the bus, in amounts of 3 watts or less, 6 watts or less, or 10 watts or less. As noted above, these latter devices are each permitted to initially draw only 3 watts from the bus, but must request and then be granted authorization to draw a specified amount of additional power from the bus. According to the industry-standard specification, these various types of devices are classified into seven or eight categories, which are set forth in Table 1.

TABLE 1

IEEE 1394 POWER UTILIZATION CATEGORIES

| Category | Binary Code | Description |
| --- | --- | --- |
| 0 | 000 | Device does not need power and does not repeat power. |
| 1 | 001 | Device is self-powered and provides a minimum of 15 W to the bus. |
| 2 | 010 | Device is self-powered and provides a minimum of 30 W to the bus. |
| 3 | 011 | Device is self-powered and provides a minimum of 45 W to the bus. |
| 4 | 100 | Device may be powered by the bus, using no more than 3 W. No additional power is needed to enable the link. |
| 5 | 101 | Reserved for future standardization. |
| 6 | 110 | Device is powered from the bus, and using no more than 3 W. An additional 3 W is needed to enable the link. |
| 7 | 111 | Device is powered from the bus, and using no more than 3 W. An additional 7 W is needed to enable the link. |

From the foregoing discussion, it should be evident that the disclosed device 10 of FIG. 1 operates in category 7 (binary code 111) if the external power source 31 is not present, and operates in category 4 (100) if the external power source 31 is present. As discussed above, devices are required to report how they interact with the bus in regard to power use, and they make this report by sending a packet which includes the appropriate binary code from Table 1. A report which includes either of the binary codes "110" and "111" also inherently constitutes a request for permission to draw additional power from the bus.

Figure 2:
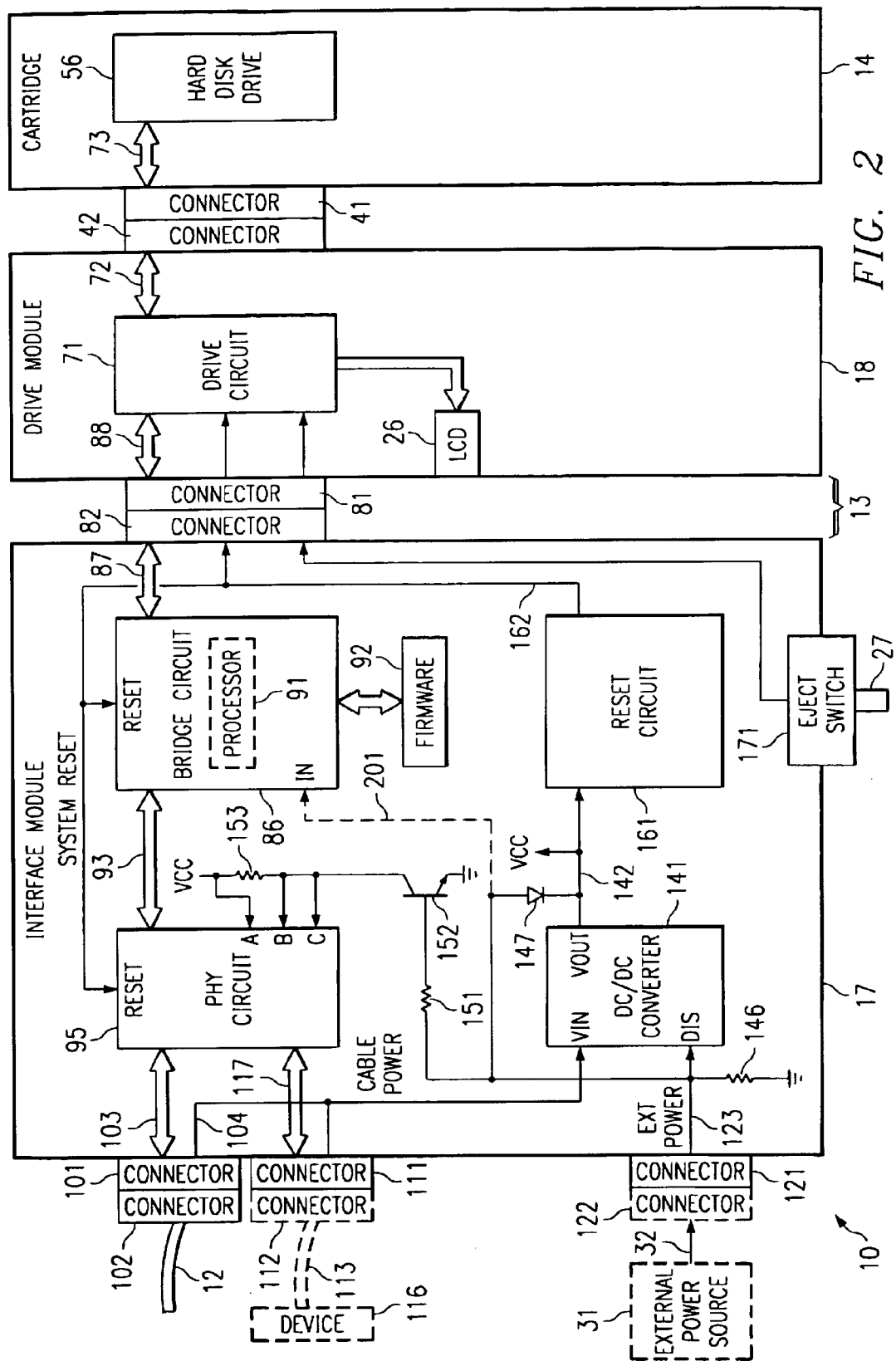
FIG. 2 is a block diagram of the information storage device of FIG. 1, showing selected internal components of the information storage device.

FIG. 2 is a block diagram of the information storage device of FIG. 1, showing selected internal components. FIG. 2 is not intended to show all of the internal components of the device 10, but only components that help to convey an understanding of the present invention. As shown in FIG. 2, the cartridge 14 has a connector 41, and the drive module 18 has a connector 42 which releasably engages the connector 41 when the cartridge 14 is removably disposed in the drive module 18. The cartridge 14 contains a hard disk drive mechanism 56. The internal structure of the hard disk drive mechanism is known, and detailed information about that internal structure is not needed in order to understand the present invention. Accordingly, the internal structure of the hard disk drive mechanism 56 is not illustrated in the drawings, and is only briefly discussed here for purposes of completeness.

In particular, the hard disk mechanism 56 includes a sealed housing, and includes within the sealed housing a data storage medium in the form of a rotatable hard disk having a magnetic material on one side thereof, and a spin motor which can effect rotation of the hard disk. The hard disk drive mechanism 56 also includes within the sealed housing an actuator arm supported for pivotal movement, a read/write head supported at one end of the actuator arm for movement adjacent and approximately radially of the magnetic surface on the disk in response to pivotal movement of the arm, and a voice coil motor (VCM) which effects pivotal movement of the actuator arm in response to electrical signals.

The drive module 18 includes a drive circuit 71, which is coupled to the hard disk drive mechanism 56 through a bus that includes portions 72 and 73 respectively disposed in the drive module and the cartridge. The connectors 41 and 42 electrically couple the portions 72 and 73 of the bus when the connectors are matingly engaged. The drive circuit 71 controls the LCD 26. The drive circuit 71 has internal structure of a known type, and detailed information about that internal structure is not needed in order to understand the present invention. Accordingly, the internal structure of the drive circuit 71 is not illustrated and described here in detail.

The drive module 18 has a connector 81, and the interface module 17 has a connector 82 which releasably engages the connector 81 when the drive module 18 is releasably coupled to the drive module 17 in the configuration shown in FIG. 1. The interface module 17 includes a bridge circuit 86, which is coupled to the drive circuit 71 in the drive module 18 by an AT Attachment (ATA) bus that has portions 87 and 88. When the connectors 81 and 82 are matingly engaged, they electrically couple the bus portion 87 to the bus portion 88. The ATA bus 87–88 conforms to an industry-standard specification, which is well known to those skilled in the art.

In the disclosed embodiment, the bridge circuit 86 is an integrated circuit which is commercially available as part number TSB42AA9 from Texas Instruments Incorporated of Dallas, Tex. The bridge circuit 86 includes a processor 91, which executes a firmware program that is stored in a read only memory (ROM) 92. The bridge circuit 86 is coupled through a bus 93 to a circuit 95, which is commonly referred to in the industry as a PHY circuit. In the disclosed embodiment, the PHY circuit 95 is an integrated circuit commercially available as part number TSB41AB2 from Texas Instruments Incorporated.

The interface module 17 has a connector 101, which can matingly engage a connector 102 provided at the end of the cable 12, so that the cable 12 can be selectively disengaged from the interface module 17 by separating the connectors 101 and 102. When the connectors 101 and 102 are engaged, a subset of the lines within the cable 12 are coupled through the connectors 101–102 and a bus 103 to the PHY circuit 95. A further line within the cable 12, which carries operating power, is coupled through the connectors 101–102 to a cable power line 104 disposed within the interface module 17.

The interface module 17 includes a further connector 111. The connector 111 can be matingly engaged by a connector 112 provided at the end of a cable 113, the other end of the cable 113 being coupled to a device 116. The device 116, the cable 13 and connector 112 are optional, and are therefore shown in broken lines in FIG. 2. Communications through the cable 113 are effected according to the IEEE 1394 protocol. When the device 116 is present, a subset of the lines within the cable 113 are coupled through a bus 117 to the PHY circuit 95. A further line within the cable 113 is coupled to the cable power line 104 in the interface module 17. The PHY circuit 95 operatively couples the device 116 to the IEEE 1394 bus within the cable 12. Thus, when the device 116 is present, it is effectively daisy-chained to the device 10, which in turn is daisy-chained through the cable 12 to some other device on the IEEE 1394 bus.

The interface module 17 has a further connector 121, which can matingly engage a connector 122 provided at the end of the cable 32 for the external power source 31. When the connectors 121 and 122 are matingly engaged, direct current (DC) power is supplied through a line in the cable 32 to an external power line 123 located within the interface module 17.

A DC-TO-DC converter circuit 141 is provided within the interface module 17, and in the disclosed embodiment is a component commercially available as part number LM2672 from National Semiconductor of Santa Clara, Calif. In the interface module 17, the DC-TO-DC converter circuit 141 serves as a voltage regulator, and receives an input voltage from the cable power line 104. The output of the converter circuit 141 is coupled to a line 142, which provides operating power (VCC) to other components within the information storage device 10.

The external power line 123 is coupled to a disable input of the converter circuit 141, is also coupled to ground through a resistor 146, and is coupled to the anode of a diode 147. The cathode of the diode 147 is coupled to the VCC line 142. The external power line 123 is also coupled through a further resistor 151 to the base of a bipolar junction transistor 152, the emitter of which is coupled to the ground. The collector of the transistor 152 is coupled through a resistor 153 to the DC operational voltage VCC.

The PHY circuit 95 has three inputs A, B and C. In pre-existing systems, these three inputs are each permanently hardwired to a logic high or a logic low. In the disclosed embodiment of FIG. 2, however, the input A is coupled to operating power VCC, but the inputs B and C are each coupled to the collector of transistor 152. The inputs A, B and C permit a three-bit binary code to be introduced into the PHY circuit 95, where input A is the most significant bit, and input C is the least significant bit. This three-bit binary code corresponds to the middle column of Table 1, as discussed later.

A reset circuit 161 of a known type has an input which is coupled to and monitors the VCC line 142, and has an output coupled to reset inputs of the PHY circuit 95 and the bridge circuit 86. The output of the reset circuit 161 is also coupled through the connectors 81 and 82 to the drive circuit 71. When the voltage on line 142 is below a predetermined threshold level, the reset circuit 161 applies a reset signal through its output 162 to each of the components coupled to the line 162. Thus, at power up, the reset circuit 161 outputs the reset signal on line 162 until operating power on the VCC line 142 is above the threshold level, and then terminates the reset signal on line 162 so that components within the information storage device 10 can commence normal operation. If operating power on VCC line 142 should happen to drop below the threshold level during normal operation, the reset circuit 161 will detect this and generate a system reset on line 162, in order to reset each device coupled to line 162 and thereby prevent operational errors until operating power on line 142 is again above the threshold level, at which time the system reset signal is terminated.

The interface module 17 includes an eject switch 171, which is operated by the eject button 27. The eject switch 171 has an output which is coupled to the drive circuit 71 through the connectors 81–82.

The operation of the system 10, and in particular the interface module 17, will now be briefly discussed. Assume that the external power source 31 is not currently present, or in other words that connector 122 is not engaged with connector 121. The resistor 146 and resistor 151 form a voltage divider which hold the external power line 123 at a voltage which is low enough to enable the converter circuit 141. Consequently, power received through cable 12 (and also possibly cable 13) is supplied through the cable power line 104 to the main input of the converter circuit 141. The converter circuit 141 processes and regulates this DC voltage, and produces the DC operating power VCC at its output on line 142.

The reset circuit 161 will initially be keeping appropriate components within the information storage device 10 in a reset mode. But once the operating voltage VCC on line 142 exceeds a predetermined threshold, the reset circuit 161 will terminate the reset signal on its output line 162, thereby permitting the device 10 to commence normal operation.

After the reset signal has been removed from the PHY circuit 95, the PHY circuit reads the three-bit binary word present at its inputs A, B and C. Since input A is coupled to VCC, it will always be a logic 1. When the external power source 31 is not present or is not active, the external power source 31 will not be applying any voltage to line 123. Thus, the resistor 153, the base-collector junction of transistor 152, and the resistors 151 and 146 will form a voltage divider which causes the disable input of the converter circuit 141 to be coupled through a low impedance to ground. Consequently, the converter circuit 141 will be enabled, and will be produce regulated DC operating power at its output on the VCC line 142.

The voltage on line 123 will be lower than the voltage on line 142. As a result, no current will be passing through the diode 147. Due to the diode 147, no base current will be flowing into transistor 152, and thus transistor 152 will be off. Consequently, there will be little or no current flowing through the resistor 153, and the voltage across it will be approximately zero volts. Thus, each of the three inputs A, B and C of the PHY circuit 95 will be receiving a logic 1, representing the binary code "111". As discussed above, this corresponds to category 7 in TABLE 1.

Shortly after the reset circuit 161 ends the power-on system reset on line 162, the circuitry within the PHY circuit 95 will read the three-bit code from its inputs A, B and C, and then report this code through the bus 12 to a bus master at a remote location, in accord with the IEEE 1394 protocol. This binary code indicates that the information storage device 10 of FIG. 2 is drawing power from the IEEE 1394 bus in an amount of 3 watts or less, but wishes to draw up to 7 additional watts from the bus. If the bus master determines that there is sufficient excess power for the information storage device 10 to receive the 7 additional watts requested, then the bus master will send through the cable 12 a LinkOn command, in response to which the information storage device 10 will begin drawing more power from the bus 12, and will commence normal operation. Thereafter, the PHY circuit 95 ignores the inputs A, B and C during normal operation.

On the other hand, if the bus master determines that there is not enough excess power for the information storage device 10 to receive the 7 additional watts it requested, then the device 10 might be precluded from operating if it had to rely on power from the IEEE 1394 bus. However, it will be recognized that the present invention allows a user to elect to attach the external power source 31 to the device 10 and thus make the device 10 operational even though there is not currently enough excess power on the bus to meet the needs of the device.

Assume now that the connector 122 is manually coupled to the connector 121, in order to couple the external power source 31 to the interface module 17. The external power source 31 will thus be supplying external power to the line 123 in the form of a DC voltage. The application of this DC voltage to the disable input of the converter circuit 141 will disable the circuit 141, so that it ignores the power available on the cable power line 104 from the cable 12 and/or the cable 113.

The voltage present on line 123 will be high enough so that current can flow through the diode 147 and establish the appropriate operating voltage on VCC line 142. Further, the voltage on line 123 acts through resistor 151 to produce at the base of transistor 152 a voltage sufficient to turn on the transistor 152. Consequently, current will flow through the resistor 153, creating a voltage across the resistor which causes the inputs B and C of the PHY circuit 95 to each appear to the PHY circuit to be a logic low. Therefore, the binary code "100" will be present and waiting at inputs A, B and C of the PHY circuit 95.

When the reset circuit detects that the operating power VCC on line 142 is above the required threshold, it terminates the reset signal on line 162, and then the PHY circuit 95 will in due course read the three-bit category code "100" which is waiting at its inputs A, B and C. The PHY circuit then automatically forwards this binary code through the cable 12 to a bus master, as discussed above. This code corresponds to category 4 in Table 1. Thereafter, normal operation of the information storage device 10 commences, and the PHY circuit 95 ignores its inputs A, B and C during normal operation.

Assume that, while the information storage device 10 is operating as a category 4 device under power from the external power source 31, a user inadvertently or intentionally disengages the connector 122 from the connector 121. The loss of external power on line 123 will enable the converter circuit 141, so that it takes power from cable power line 104, and in due course begins producing operating power on the VCC line 142. However, it takes a short but finite time interval for the converter circuit 141 to transition from its disabled state to its enabled state, which in the disclosed embodiment is approximately 100 milliseconds.

During this time interval, the power which the reset circuit 161 receives on line 142 from the external power line 123 through the diode 147 will drop somewhat, to a level below the threshold. This will cause the reset circuit 162 to output onto line 162 a system reset. Once the converter circuit 141 has completed the transition from its disabled state to its enabled state, it will be producing power on the VCC line 142 which is above the threshold and which thus causes the reset circuit 161 to terminate the system reset signal that it generated. Consequently, the information storage device 10 will again commence the initialization process that leads to normal operation.

As part of this, the PHY circuit 95 will read its inputs A, B and C, and forward this three-bit binary word to the remote bus master. At this time, the three-bit binary word will be the code "111", indicating that the device 10 is now operating as a category 7 device drawing 3 watts or less from the IEEE 1394 bus, but wants to draw up to 7 watts of additional power from the bus. In this manner, due to the reset from reset circuit 161, the interface storage device 10 will again log onto the IEEE 1394 bus, in a manner similar to that described above for the case where power is turned on. If the bus master determines that there is sufficient excess power available on the bus to meet the request of the device 10, the bus master will send a LinkOn command that authorizes the information storage device 10 to begin drawing additional power through the cable 12. Thus, in the event that power from the external power source 31 is lost in the middle of normal system operation, a smooth transition will occur from operation on power from the source 31 to operation on power from the cable 12, in conjunction with reporting across the bus that the system is now operating in category 7 rather than category 4.

The foregoing discussion of FIG. 2 is directed to one embodiment of the present invention. Still referring to FIG. 2, an alternative embodiment is almost the same, except that the external power line 123 has an additional section represented by broken line 201, which extends to an input of the bridge circuit 86. It will be recognized that, in this alternative embodiment, the bridge circuit can sense the state of the external power line 123, and thus determine whether or not the device 10 is currently receiving power from the external power source 31. The bridge circuit periodically polls the state of the line 123 (through the portion 201 thereof). In the disclosed embodiment, the bridge circuit has an interrupt input driven by a crystal oscillator so as to produce interrupts at periodic intervals such as every 10 milliseconds, in order to facilitate timekeeping functions within the program executed by the bridge circuit. The line 123 is polled by the interrupt service routine each time the oscillator interrupt occurs.

One other difference, not visible in FIG. 2, is that the threshold of the reset circuit 161 is set to be somewhat lower. As a result, when the external power source 31 is disengaged from the device 10 while the device 10 is carrying out normal operation as a category 4 device, the reset circuit 161 will not generate a reset during the time required for the converter circuit to 141 to transition from its disabled state to its enabled state.

In this alternative embodiment, operation at power up is effected in substantially the same manner already discussed above. On the other hand, when the connectors 121 and 122 are engaged or disengaged during normal operation of the device 10, the sequence of events is somewhat different.

In this regard, assume that the information storage device 10 is currently operating on power from the external power source 31. Assume also that the connectors 121 and 122 are suddenly disengaged, either inadvertently or intentionally. This will cause the voltage on line 123 to drop, such that in due course the bridge circuit 86 will poll this line and determine that it has changed from a logic high to a logic low. This change tells the bridge circuit that the device 10 is no longer receiving operating power from the external power source 31. The bridge circuit 86 responds by instructing the PHY circuit 95 to effect a reset operation on the IEEE 1394 bus, and this reset operation will in turn force all devices on the bus, including the device 10, to pursue essentially the same techniques used to gain access to the bus at power up, and to report the power consumption category in which they are operating.

It will be recognized that, at this time, the inputs A, B and C to the PHY circuit 95 will be carrying the three-bit binary code 111, causing the PHY circuit to advise the bus master that the information storage device 10 is currently operating in category 7, or in other words using 3 watts from cable power line 104 while requesting permission to draw additional power. This request is authorized where possible, in the manner already described above.

As a different scenario, assume that the information storage device 10 is operating under power from the IEEE 1394 interface on bus 12, and that a user intentionally engages the connector 122 with the connector 121, in order to couple the external power source 31 to the information storage device 10. The power source 31 will promptly provide DC power to line 123 and, through diode 147, to VCC line 142. The voltage on line 123 will disable the converter circuit 141, so that very shortly thereafter it stops trying to supply power to line 142. Since line 123 (including portion 201 thereof) will have transitioned from a logic low voltage to a logic high voltage, the bridge circuit 86 will detect this change the next time it polls the input coupled to line 123, and will then cause the PHY circuit 95 to effect a reset of the IEEE 1394 bus. As before, this reset causes the PHY circuit 95 to read its three inputs A, B and C in the same manner discussed above in association with a power-up condition, and to use this three-bit code, which is a binary 100, to report to the bus master its current power status, which is category 4.

The present invention provides a number of technical advantages. One such technical advantage is that, in the context of an IEEE 1394 environment, a device can be selectively operated in either of two modes, where power is respectively obtained from either the IEEE 1394 bus or an external power source. According to a related advantage, the device can automatically determine at power-up its current source of operating power, and then report this information to a remote bus master which manages the bus.

According to another advantage, the device can automatically handle disconnection of the external power source during system operation, including reporting to the bus master of the change in its power consumption category. A similar advantage is that the device can automatically handle connection of the external power source during system operation, including reporting to the bus master of the change in its power consumption category.

According to another advantage, the device includes a processor which has the capability to monitor at least one source of operating power and automatically detect any change in the source of operating power, and then ensure that the change in its source of operating power is reported to the bus master. According to a related advantage, the processor can cause the reporting to occur by initiating a reset operation on the IEEE 1394 bus.

Although two embodiments have been illustrated and described in detail, it will be understood that various substitutions and alterations can be made therein without departing from the spirit and scope of the present invention, as defined by the following claims.

What is claimed is:

1. An apparatus comprising a device that includes:
    a first coupling section which can detachably couple said device to a bus that includes a power line;
    a second coupling section which can detachably couple said device to a source of power;
    circuitry coupled to each of said first and second coupling sections, said circuitry operating in a first mode in which said circuitry draws operating power from the power line through said first coupling section when no power is being received through said second coupling section, operating in a second mode in which said circuitry draws power through said second coupling section when a power source is supplying power to said second coupling section, automatically determining which of said first and second modes said circuitry is operating in, and automatically reporting through said first coupling section which of said first and second modes said circuitry is currently operating in;

wherein said circuitry automatically switches from said first mode to said second mode when a power supply begins supplying power through said second coupling section during operation of said circuitry in said first mode, and automatically reports through said first coupling section that said circuitry is now operation in said second mode; and wherein said circuitry includes a processor which monitors whether power from a power supply is present at said second coupling section, and which causes a reset of said bus upon detecting that a power supply has just started supplying power through said second coupling section.

2. The apparatus according to claim 1, wherein said bus conforms to the IEEE 1394 protocol.

3. An apparatus comprising a device that includes:

a first coupling section which can detachably couple said device to a bus that includes a power line;

a second coupling section which can detachably couple said device to a source of power;

circuitry coupled to each of said first and second coupling sections, said circuitry operating in a first mode in which said circuitry draws operating power from the power line through said first coupling section when no power is being received through said second coupling section, operating in a second mode in which said circuitry draws power through said second coupling section when a power source is supplying power to said second coupling section, automatically determining which of said first and second modes said circuitry is operating in, and automatically reporting through said first coupling section which of said first and second modes said circuitry is currently operating in;

wherein said circuitry automatically switches from said second mode to said first mode when a power supply stops supplying power through said second coupling section during operation of said circuitry in said second mode, and automatically reports through said first coupling section that said circuitry is now operating in said first mode; and wherein said circuitry includes a processor which monitors whether power from a power supply is present at said second coupling section, and which causes a reset of said bus upon detecting that a power supply has just stopped supplying power through said second coupling section.

4. The apparatus according to claim 3, wherein said bus conforms to the IEEE 1394 protocol.

5. A method of operating a device having a first coupling section which can detachably couple said device to a bus that includes a power line, having a second coupling section which can detachably couple said device to a source of power, and circuitry coupled to each of said first and second coupling sections, comprising the steps of;

operating said circuitry in a selected one of a plurality of modes, including a first mode in which said circuitry draws operating power from the power line through said first coupling section when no power is being received through said second coupling section, and a second mode in which said circuitry draws power through said second coupling section when a power source is supplying power to said second coupling section;

automatically determining which of said first and second modes said circuitry is currently operating in;

automatically reporting through said first coupling section which of said first and second modes said circuitry is currently operating in, automatically switching from said first mode to said second mode when a power supply begins supplying power through said second coupling section during operation in said first mode;

automatically reporting through said first coupling section that operation is now occurring in said second mode; and monitoring whether power from a power supply is present at said second coupling section, and forcing a reset of said bus upon detecting that a power supply has just started supplying power through said second coupling section.

6. The method according to claim 5, including the step of configuring said bus to conform to the IEEE 1394 protocol.

7. A method of operating a device having a first coupling section which can detachably couple said device to a bus that includes a power line, having a second coupling section which can detachably couple said device to a source of power, and circuitry coupled to each of said first and second coupling sections, comprising the steps of;

operating said circuitry in a selected one of a plurality of modes, including a first mode in which said circuitry draws operating power from the power line through said first coupling section when no power is being received through said second coupling section, and a second mode in which said circuitry draws power through said second coupling section when a power source is supplying power to said second coupling section;

automatically determining which of said first and second modes said circuitry is currently operating in;

automatically reporting through said first coupling section which of said first and second modes said circuitry is currently operating in;

automatically switching from said second mode to said first mode when a power supply stops supplying power through said second coupling section during operation of said circuitry in said second mode;

automatically reporting through said first coupling section that that operation is now occurring in said first mode; and monitoring whether power from a power supply is present at said second coupling section, and forcing a reset of said bus upon detecting that a power supply has just stopped supplying power to said second coupling section.

8. The method according to claim 7, including the step of configuring said bus to conform to the IEEE 1394 protocol.

* * * * *